No. 621,546. Patented Mar. 21, 1899.
J. STEVENS.
ELEVATOR.
(Application filed Dec. 27, 1898.)
(No Model.)
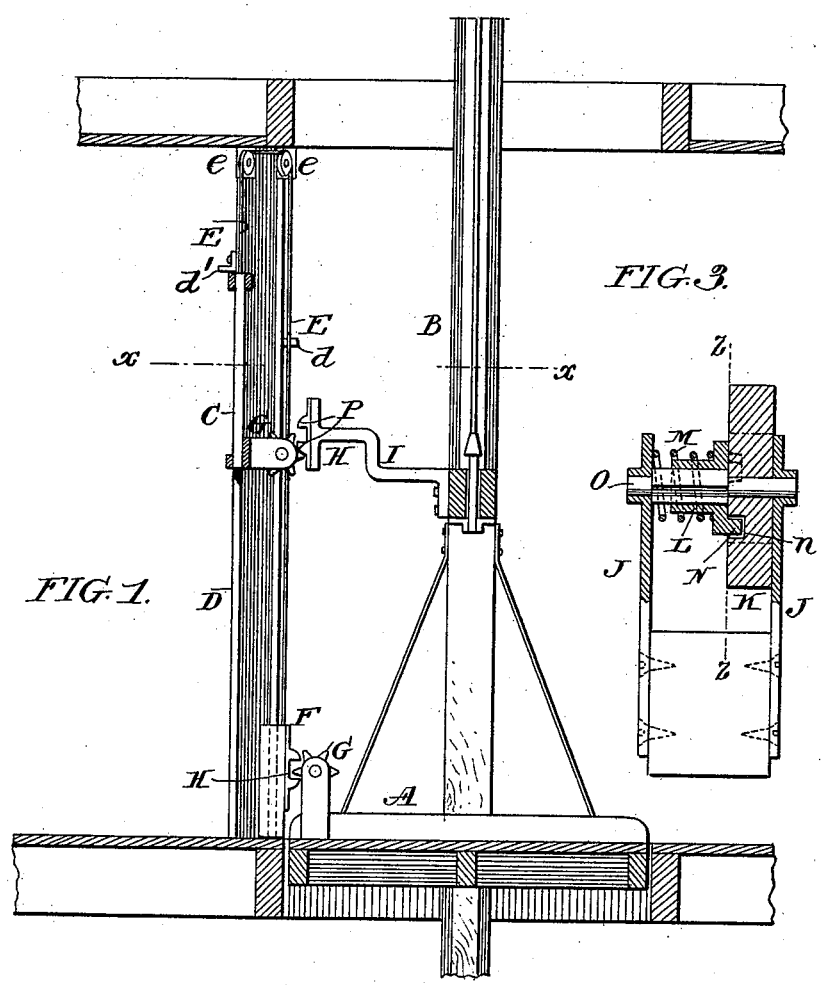
Witnesses:
Henry Drury
R. M. Kelly
Inventor:
John Stevens

UNITED STATES PATENT OFFICE.

JOHN STEVENS, OF PHILADELPHIA, PENNSYLVANIA.

ELEVATOR.

SPECIFICATION forming part of Letters Patent No. 621,546, dated March 21, 1899.

Application filed December 27, 1898. Serial No. 700,308. (No model.)

*To all whom it may concern:*

Be it known that I, JOHN STEVENS, of the city and county of Philadelphia, State of Pennsylvania, have invented an Improvement in Elevators, of which the following is a specification.

My invention has reference to elevators; and it consists of certain improvements, all of which are fully set forth in the following specification and shown in the accompanying drawings, which form a part thereof.

This invention is an improvement upon the construction of elevator and automatic gate set out in Letters Patent No. 305,542, dated September 23, 1884. In said former patent the gate was slightly counterweighted, but so as to automatically close when released, and was operated by the moving cage by means of suitable pawls. The objection to the construction therein claimed is due to the fact that it is not positive, and if there is any defect in the pawl which sustains the gate the latter is liable to fall and thereby be a constant source of danger.

My present improvements have for their object the operation of the gate in a positive manner and without relying upon gravity as a means of closing the gate. In this manner I may counterbalance the gate so that it will stay open or closed, and hence is not a constant source of danger, and combine therewith a suitable automatic latching device for operating the gate from the moving cage or platform. It is preferable that these devices shall so operate that when the cage ascends or descends it shall automatically open the gate and hold it open so long as the cage is retained at the floor corresponding to the gate and close the gate positively when it leaves the floor in ascending or descending.

My invention also comprehends various details of construction of the automatic latching devices and will be better understood by reference to the drawings, in which—

Figure 1 is a sectional elevation of an elevator embodying my invention, taken on line $y\ y$ of Fig. 2. Fig. 2 is a sectional plan view of same on line $x\ x$ of Fig. 1. Fig. 3 is a sectional view on line $w\ w$ of Fig. 4, showing my improved latching device. Fig. 4 is a similar view taken on line $z\ z$ of Fig. 3. Fig. 5 is a perspective view of a portion of the latching device, and Fig. 6 is a sectional elevation of a modification.

A is the elevator cage or platform and may be of any suitable construction, either open or inclosed, and is guided vertically by the usual guides B B.

C is a gate or door of any preferred design and is guided vertically in guides D D. This gate is counterweighted at F, with which it is connected by a cable E, passing over guide-wheels $e$ at the top. The counterweight F is guided on the guide D at one side of the gate or may be guided in any other suitable manner, and its weight is just sufficient to permit the gate to remain open when raised and to insure its being raised and lowered with a small amount of energy. The counterweight F is provided with two teeth, forming a notch or jaw H. On the lower part of the cage or platform A is a clutch G, consisting of the following parts adapted to coact with the jaw H: A frame J J carries a shaft O, held stationary and formed with a polygonal and a round portion, Fig. 3. Loosely journaled upon the round portion is a star-wheel or pinion K, provided with a series of notches $n$ in its face. Secured upon the polygonal portion of the shaft is a clutch L, having teeth N, adapted to the notches $n$. This clutch is held against rotation and yet is free to slide longitudinally upon the shaft. It is pressed forward into clutching position by a spring M. The teeth N are beveled, as shown in Fig. 5, so as to require considerable friction to unlatch them from the notches $n$. It is immaterial whether the teeth and notches are as shown or reversed so long as they work in the manner described. The toothed wheel K works in combination with the jaw H, as shown. Normally or when not actuating the gate the pinion K will be turned so that the teeth N are out of the notches $n$ and rest upon the face of the pinion, and the spring creates a friction sufficient to hold these parts in position, but under a greater pressure permits the pinion to rotate until the teeth N are received in the notches $n$. This action takes place when the cage in ascending or descending causes the pinion to strike the jaw H. When a tooth of the pinion K is received in the jaw of the counterweight F, it moves the latter until forcibly turned by the counterweight coming against a stop and the cage moving on. In this manner the clutch resets itself, so as to be ready for action upon the counterweight of the next floor. There is a similar jaw H on an arm I at the top of the cage A and a similar clutch G on the bottom of the gate C. These parts coact in the same manner as above set out, only the action in this case is upon the gate itself instead of the counterweight. Of course it is self-evident that it is immaterial whether the jaw H is applied to the cage, counterweight, or gate so long as a jaw and a clutch device operate in pairs, as described.

In the operation let us assume the gate as closed and the cage A descending. The clutch-wheel K of the device G on the cage will roll into clutching connection with the jaw H and in descending will pull down the counterweight and raise the gate. As the cage descends the upper jaw H is moved into clutching connection with the pinion or clutch-wheel K of the device G on the gate just as the counterweight is liberated. The descent of the cage now positively lowers the gate C. As the cage passes down the pinions K are turned again into position to remove the teeth N from the notches n. The same operations take place in ascending, only in the reverse order.

It will be observed that the automatic nature of the apparatus is well secured without the danger of a falling gate. It is also seen that the connection between the cage and gate apparatus is easily made and then retained against considerable resistance. I would point out that when the teeth of the pinion K strike the jaw the greatest leverage is exerted to turn it, and the parts N n offer the least resistance. After the pinion is turned then the shortest leverage is exerted to turn it and the greatest resistance is offered by the parts N n. This question of leverages is secured by making the teeth P P of the jaw H beveled at top and bottom, but square on adjacent faces, as shown. To still further reduce the resistance to clutching, the teeth of the jaws H may be pivoted and held in position by a spring, as shown in Fig. 6. In this figure H' is the jaw, having the pivoted teeth P', like pawls, pressed outward by a spring p. These teeth may move freely toward each other, but not outward or away from each other.

While I prefer the constructions shown as being excellently adapted to the purpose, I do not limit myself thereto, as the details may be modified in various ways without departing from the spirit of the invention.

Having now described my invention, what I claim as new, and desire to secure by Letters Patent, is—

1. In elevator apparatus, the combination of a movable gate, a counterweight therefor whereby the gate is sustained normally against closing, a moving cage or platform, automatic clutches for successively connecting the cage or platform with the counterweight and gate or vice versa, whereby the counterweight may be automatically raised for closing the gate or the gate automatically opened, said automatic clutching devices consisting of a jaw connected to one of the movable members namely the cage or the gate mechanism and a star-wheel or pinion carried by the other movable member of the elevator apparatus adapted to rotate into and out of connection with the jaw, and means for imposing a greater resistance against said star-wheel or pinion rotating when in clutched relation with the jaw than when clear thereof.

2. In elevator apparatus, the combination of a movable gate, a counterweight therefor whereby the gate is sustained normally against closing, a moving cage or platform, automatic clutches for successively connecting the cage or platform with the counterweight and gate or vice versa, whereby the counterweight may be automatically raised for closing the gate or the gate automatically opened, said automatic clutching devices consisting of a jaw connected to one of the movable members namely the cage or the gate mechanism and a star-wheel or pinion carried by the other movable member of the elevator apparatus adapted to rotate into and out of connection with the jaw, and means for imposing a greater resistance against said star-wheel or pinion rotating when in clutched relation with the jaw than when clear thereof comprising a friction-clutch one part of which is formed on the star-wheel and the other part held against rotation, and a spring for normally causing the two parts of the clutch to be forced together.

3. In an elevator apparatus, a movable gate, a vertically-movable part for moving the said gate, a moving cage or platform and a clutching device between the moving cage and the movable part for operating the gate consisting of a jaw connected to one of the parts, and a star-wheel carried by the other part and provided with a friction-brake or resistance to hold it against rotation with greater force when in clutched relation with the jaw than when free thereof.

4. In an elevator apparatus, a movable gate, a vertically-movable part for moving the said gate, a moving cage or platform and a clutching device between the moving cage and the movable part for operating the gate consisting of a jaw connected to one of the parts and provided with two spring-actuated teeth movable to or from each other under pressure to hold against divergence beyond a given predetermined point whereby they shall respectively act as pawls movable in opposite directions, and a star-wheel carried by the other part and provided with a friction-brake or resistance to hold it against rotation with greater force when in clutched relation with the jaw than when free thereof.

5. In an elevator apparatus, a movable gate, a vertically-movable part for moving the said gate, a moving cage or platform and a clutching device between the moving cage and the movable part for operating the gate consisting of a jaw connected to one of the parts, and a star-wheel carried by the other part and provided with a friction-brake or resistance to hold it against rotation with greater force when in clutched relation with the jaw than when free thereof, said friction devices comprising a clutch held against revolution and having a connection with the star-wheel through teeth and sockets, and means to create a pressure between the clutch devices and the star-wheel.

6. In a clutch device for operating an elevator-gate apparatus, the combination of a star-wheel K loosely pivoted so as to revolve and having notches $n$ in its face, a clutch L having teeth N with beveled edges adapted to the notches in the star-wheel, and held against rotation, and spring or pressure devices for forcing the clutch against the star-wheel, the construction being such that the star-wheel offers great resistance to turning when the teeth N are received in the notches $n$ and merely resists when said teeth are out of said sockets.

In testimony of which invention I hereunto set my hand.

JOHN STEVENS.

Witnesses:
R. M. HUNTER,
J. W. KENWORTHY.